(12) United States Patent
Südow et al.

(10) Patent No.: US 9,733,377 B2
(45) Date of Patent: *Aug. 15, 2017

(54) METHOD AND SYSTEM FOR STREAMER DEPTH CONTROL

(71) Applicant: PGS Geophysical AS, Oslo (NO)

(72) Inventors: Gustav Göran Mattias Südow, Houston, TX (US); Ulf Peter Lindqvist, Kista (SE); Andras Robert Juhasz, Kista (SE)

(73) Assignee: PGS Geophysical, A.S., Oslo (NO)

( * ) Notice: Subject to any disclaimer, the term of this patent is extended or adjusted under 35 U.S.C. 154(b) by 254 days.

This patent is subject to a terminal disclaimer.

(21) Appl. No.: 14/606,041

(22) Filed: Jan. 27, 2015

(65) Prior Publication Data

US 2015/0153469 A1    Jun. 4, 2015

Related U.S. Application Data

(63) Continuation of application No. 12/928,667, filed on Dec. 16, 2010, now Pat. No. 8,995,220, and a (Continued)

(51) Int. Cl.
    *G01V 1/38* (2006.01)
(52) U.S. Cl.
    CPC .................. *G01V 1/3826* (2013.01)
(58) Field of Classification Search
    CPC ....... G01V 1/38; G01V 1/3817; G01V 1/3826
    See application file for complete search history.

(56) References Cited

U.S. PATENT DOCUMENTS 2,838,731 A    6/1958  Cruzan et al.
3,182,250 A    5/1965  Mayes
(Continued)

FOREIGN PATENT DOCUMENTS

GB    2424949 A       11/2006
WO    2007006785 A2    1/2007
WO    2009158205 A2   12/2009

OTHER PUBLICATIONS

Dual Axis Electrolytic Tilt Sensors—SP5000 and AU6000 Series, www.spectrosensors.com, Document No. SDS-117-1409, downloaded Sep. 10, 2010.
(Continued)

*Primary Examiner* — Hovhannes Baghdasaryan
(74) *Attorney, Agent, or Firm* — Richard A. Fagin

(57) ABSTRACT

Depth and tilt control systems for geophysical sensor streamers and methods of use are discussed. Such systems may include a plurality of tilt sensors disposed at spaced apart locations along the geophysical sensor streamer, each tilt sensor having a first tilt sensing element arranged to measure tilt of the geophysical sensor streamer proximate the associated spaced apart location, a plurality of LFD control devices, each disposed proximate one of the tilt sensors along the geophysical sensor streamer, and a plurality of microcontrollers, each microcontroller in signal communication with at least one of the LFD control devices and its associated tilt sensor, wherein each microcontroller is capable of utilizing the tilt measured by the associated tilt sensor to selectively operate the associated LFD control device to cause the geophysical sensor streamer to align with a selected depth profile.

11 Claims, 4 Drawing Sheets

Related U.S. Application Data continuation-in-part of application No. 12/657,831, filed on Jan. 28, 2010, now abandoned.

(56) References Cited

U.S. PATENT DOCUMENTS

| | | | |
|---|---|---|---|
| 4,298,840 | A | 11/1981 | Bischoff et al. |
| 4,617,518 | A | 10/1986 | Srnka |
| 6,144,342 | A | 11/2000 | Bertheas et al. |
| 6,525,992 | B1 * | 2/2003 | Olivier .................. G01V 1/201 114/245 |
| 7,142,481 | B1 | 11/2006 | Metzbower et al. |
| 7,167,412 | B2 | 1/2007 | Tenghamn |
| 7,298,672 | B1 | 11/2007 | Tenghamn et al. |
| 7,359,283 | B2 | 4/2008 | Vaage et al. |
| 7,684,281 | B2 | 3/2010 | Vaage et al. |
| 8,400,871 | B2 | 3/2013 | Meldahl et al. |
| 2006/0133199 | A1 * | 6/2006 | Tenghamn .............. B63B 21/66 367/17 |
| 2006/0176775 | A1 | 8/2006 | Toennessen |
| 2008/0192570 | A1 | 8/2008 | Tenghamn et al. |
| 2008/0253225 | A1 | 10/2008 | Welker et al. |
| 2008/0316859 | A1 | 12/2008 | Welker et al. |

OTHER PUBLICATIONS

Innovation in Geotechnical Instrumentation, www.rstinstruments.com, downloaded Sep. 10, 2010.

Search Report, European Patent Application No. 11152552.3, Jan. 28, 2013.

EE Times Product Brief, "MEMS tilt sensor delivers high accuracy, dual mode and small size", Oct. 22, 2007. www.eetimes.com, downloaded Jun. 14, 2012.

* cited by examiner

METHOD AND SYSTEM FOR STREAMER DEPTH CONTROL

CROSS-REFERENCE TO RELATED APPLICATIONS

This is a continuation of co-pending U.S. patent application Ser. No. 12/928,667 filed on Dec. 16, 2010, which application is a continuation-in-part of co-pending U.S. patent application Ser. No. 12/657,831, filed Jan. 28, 2010, both of which are herein incorporated by reference in their entirety.

STATEMENT REGARDING FEDERALLY SPONSORED RESEARCH OR DEVELOPMENT

Not applicable.

BACKGROUND

The invention relates generally to the field of marine geophysical surveying. More particularly, at least in some embodiments, the invention relates to devices and methods for controlling the depth profile of marine geophysical sensor streamers as they are towed in a body of water.

Certain types of marine geophysical surveying, such as seismic or electromagnetic surveying, include towing an energy source at a selected depth in a body of water. One or more geophysical sensor streamers also may be towed in the water at selected depths. The streamers are essentially long cables having geophysical sensors disposed thereon at spaced apart locations. Actuation of the energy source emits an energy field into the body of water. The energy field interacts with the rock formations below the water bottom. Reflected energy from interfaces, generally at the boundaries between layers of rock formations, is returned toward the surface and is detected by the sensors on the one or more streamers. The detected energy is used to infer certain properties of the subsurface rock formations, such as structure, mineral composition and fluid content, thereby providing information useful in the recovery of hydrocarbons.

For certain types of surveying, it is important that a streamer is maintained as closely as possible to a selected depth profile in the water. For example, electromagnetic surveying using a towed streamer is currently limited by the noise originating from towing the streamer through the water. Towing noise may be reduced by maintaining the streamer at a substantially constant depth, thereby keeping the streamer as level as possible. Devices commonly used to regulate streamer depth include lateral force and depth (LFD) control devices. For example, U.S. Pat. No. 6,144,342 issued to Bertheas et al. describes a structure for LFD control devices and a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals may be transmitted between the streamer and the bird by rotary transformers. (In some applications, birds may utilize localized battery power.) The bird is fixed to the streamer by a bore closed by a cover. The bird can be detached automatically as the streamer is raised so that the streamer can be wound freely onto a drum. The disclosed method purportedly allows the full control of the deformation, immersion depth, and heading of the streamer.

Often, such LFD control devices are used in conjunction with sensors, such as pressure sensors, capable of generating a signal related to depth. The sensors may be positioned along the streamer. Typical pressure sensors used in geophysical surveying can be calibrated to a precision of about 0.1 percent of the full scale range of the sensor. While a streamer using only pressure sensors for depth measurement can be navigated laterally in the water to a precision of about 1 meter, at a water depth of about 1000 meters and greater, the possible error in navigation of the streamer in the vertical plane becomes proportionately larger.

Some survey conditions necessitate towing of streamers with various non-level depth profiles. For example, it may be optimal to tow a streamer with a constant gradient to optimally follow the survey area bathymetry, thereby optimizing the signal-to-noise ratio in the received signal.

What is needed is a system that can assist in navigation of a geophysical sensor streamer in the vertical plane at relatively great water depth.

SUMMARY

The invention relates generally to the field of marine geophysical surveying. More particularly, at least in some embodiments, the invention relates to devices and methods for controlling the depth profile of marine geophysical sensor streamers as they are towed in a body of water.

A depth and tilt control system for a geophysical sensor streamer according to one aspect of the invention includes a plurality of tilt sensors disposed at spaced apart locations along the geophysical sensor streamer, each tilt sensor having a first tilt sensing element arranged to measure tilt of the geophysical sensor streamer proximate the associated spaced apart location. The system also includes a plurality of LFD control devices, each disposed proximate one of the tilt sensors along the geophysical sensor streamer. The system also includes a plurality of microcontrollers, each microcontroller in signal communication with at least one of the LFD control devices and its associated tilt sensor, wherein each microcontroller is capable of utilizing the tilt measured by the associated tilt sensor to selectively operate the associated LFD control device to cause the geophysical sensor streamer to align with a selected depth profile.

A method for depth and tilt control of a geophysical sensor streamer according to another aspect of the invention includes towing the geophysical sensor streamer in a body of water. The method also includes measuring tilt along the longitudinal dimension of the geophysical sensor streamer with tilt sensors at a plurality of spaced apart locations along the geophysical sensor streamer. The method also includes deflecting the geophysical sensor streamer in the vertical plane proximate at least one spaced apart location in response to the measured tilt at that location to cause the geophysical sensor streamer to align with a selected depth profile.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DETAILED DESCRIPTION

The invention relates generally to the field of marine geophysical surveying. More particularly, at least in some embodiments, the invention relates to devices and methods for controlling the depth profile of marine geophysical sensor streamers as they are towed in a body of water.

One of the many potential advantages of the systems and methods of the present invention, only some of which are herein disclosed, is that a marine geophysical sensor streamer may be maintained at a selected depth profile in the water. Systems and methods of the present invention may provide greater precision for depth measurement than obtainable with conventional pressure sensors. Additionally, systems and methods of the present invention may allow for streamer towing with various depth profiles. For example, some embodiments enable towing a streamer at a constant gradient (also referred to as constant slope or constant tilt) to optimally follow the survey area bathymetry, thereby optimizing the signal-to-noise ratio in the received signal.

Figure 1:
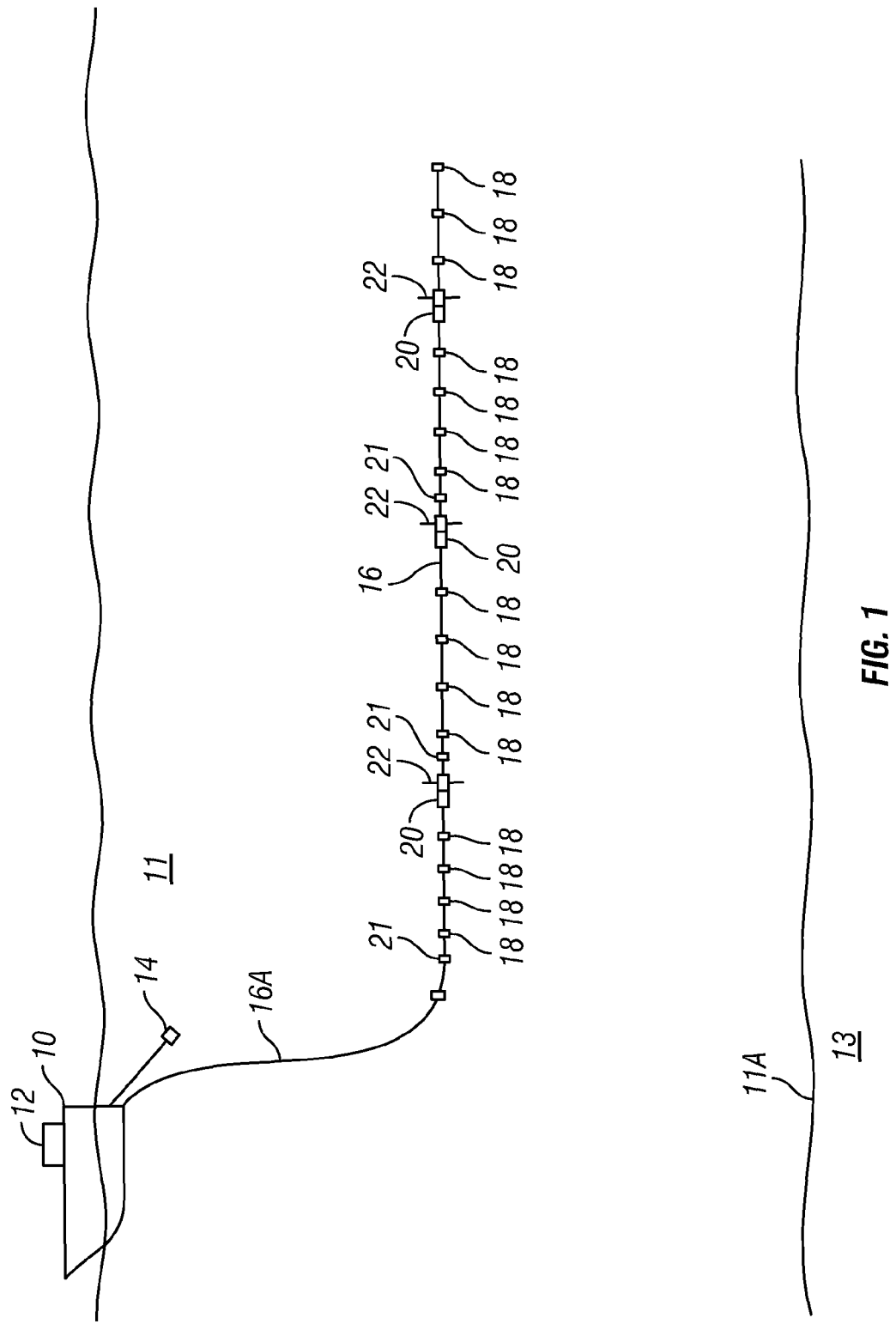
FIG. 1 shows an example geophysical survey system, according to one embodiment of the invention, with a streamer having tilt sensor modules.

An example marine geophysical survey system, according to one embodiment of the invention, is shown schematically in FIG. 1. The system may include a survey and towing vessel 10 that moves along the surface of a body of water 11, such as a lake or ocean. The vessel 10 includes thereon equipment, shown generally at 12 and collectively referred to herein as a "recording system." The recording system 12 may include devices (none shown separately) for determining geodetic position of the vessel (e.g., a global positioning system satellite signal receiver), for detecting and making a time indexed record of signals generated by each of a plurality of geophysical sensors 18 (explained further below), and for actuating an energy source 14 at selected times. The energy source 14 may be any selectively actuatable source used for subsurface geophysical surveying, including without limitation seismic air guns, water guns, vibrators or arrays of such devices, or one or more electromagnetic field transmitters.

In the present example, a plurality of geophysical sensors 18 may be disposed at spaced apart locations along a streamer 16. A non-limiting example of a structure for a geophysical sensor streamer cable is described in U.S. Pat. No. 7,298,672 issued to Tenghamn et al. and herein incorporated by reference. The sensors may be, without limitation, seismic sensors such as geophones, hydrophones, or accelerometers, or electromagnetic field sensors such as electrodes, magnetic field sensors, or magnetometers. The sensors 18 may generate response signals, such as electrical or optical signals, in response to detecting energy emitted from the source 14 after the energy has interacted with rock formations 13 below the water bottom 11A. The streamer 16 may be connected directly to the vessel 10 using a lead in line 16A. In some embodiments, lead in line 16A may communicate power and/or signals between the recording unit 12 and the various electronic components in the streamer 16. The lead in line 16A may also transmit towing force from the vessel 10 to the streamer 16.

The streamer 16 is typically formed by connecting a plurality of streamer segments end-to-end as explained in U.S. Pat. No. 7,142,481 issued to Metzbower et al. and herein incorporated by reference. The streamer segments may be coupled by assembling corresponding termination plates (FIG. 3) at each end of each streamer segment. In the present example, at selected couplings between streamer segments, the streamer may include an lateral force and depth (LFD) control device 22 and an associated tilt sensor module 20. One example of an LFD control device that may be coupled between streamer segments is described in U.S. Patent Application Publication No. 2008/0192570 filed by Tenghamn et al. and herein incorporated by reference. U.S. Pat. No. 6,144,342 issued to Bertheas et al. describes another structure for LFD control devices that may be coupled between streamer segments. The tilt sensor module 20 will be further explained with reference to FIG. 3. The tilt sensor module 20 may couple between streamer segments as shown in FIG. 1. In some embodiments, a tilt sensor module 20 may be a component of one or more of the LFD control devices 22. Although the present example is described as using LFD control devices capable of navigating the streamer in both the horizontal and vertical planes, for purposes of the invention, it is only necessary to have one or more devices along the streamer which can navigate the streamer in the vertical plane. It should also be noted that, while the present example shows only one streamer, the invention is applicable to any number of laterally spaced apart streamers towed by the survey vessel 10 or any other vessel.

The streamer 16 may also include a plurality of depth sensors 21 disposed at spaced apart positions along the length of the streamer. In some embodiments, the depth sensors 21 may be pressure sensors. For example, the depth sensors 21 may be configured to measure pressure in the water 11, which may provide an approximate indication of the depth of the streamer 16 in the water at the position of each depth sensor 21. In some embodiments, the depth sensors 21 may each be disposed in one of the tilt sensor modules 20.

Figure 2:
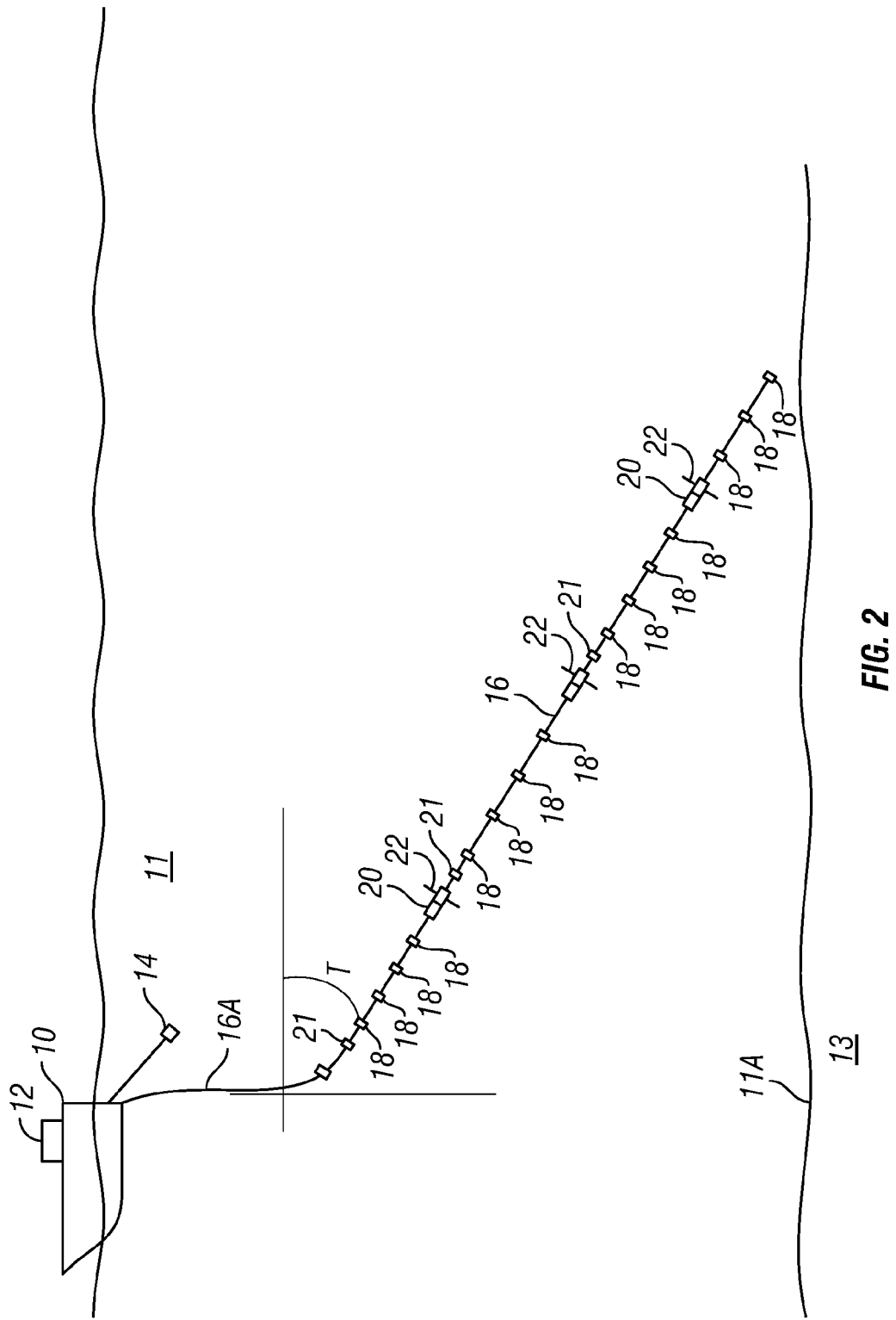
FIG. 2 shows another example geophysical survey system, according to another embodiment of the invention, with a streamer having tilt sensor modules.

Another example marine geophysical survey system, according to another embodiment of the invention, is shown schematically in FIG. 2. In contrast with the system of FIG. 1, this embodiment illustrates that the components of the system may work together to position the streamer with a tilted depth profile. For example, the forward end of the streamer 16 (nearer the vessel 10 in FIG. 2) may be maintained at a shallower depth than the aft end of the streamer 16, with substantially constant slope between the ends. In another embodiment (not illustrated), the aft end of the streamer 16 may be maintained at a shallower depth than the forward end of the streamer 16, with substantially constant slope between the ends. In still another embodiment (not illustrated), either end or any mid-point of the streamer 16 may be maintained at a shallower or greater depth than other points along streamer 16. Various such depth profiles for streamer 16 may be selected to adapt the system to operating conditions and survey requirements. For example, the embodiment illustrated in FIG. 2 may be well suited for sloping geologies along water bottom 11A.

Figure 3:
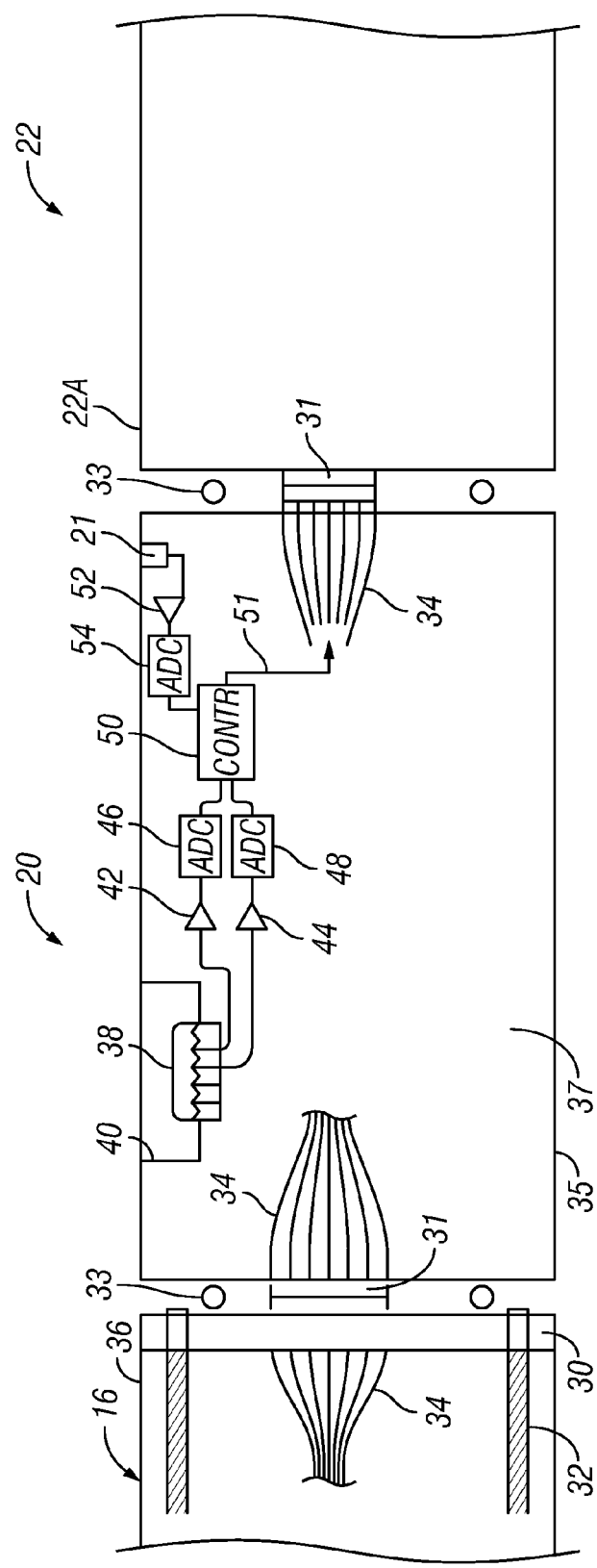
FIG. 3 shows more detail of an example of one of the tilt sensor modules shown in FIGS. 1 and 2.

FIG. 3 shows schematically an example of a tilt sensor module 20. The tilt sensor module 20 may include a pressure sealed, high strength housing 35. The material used for the housing should be able to withstand hydrostatic pressure of the water at the maximum intended operating depth of the streamer 16. The housing 35 may be generally cylindrically shaped, may be approximately the same external diameter as the streamer, and may include at each of its longitudinal ends an electrical/optical connector 31 to enable electrical and/or optical connection between individual conductors and/or optical fibers in a wire harness 34 that extends along the length of the streamer 16. The housing 35 may define a sealed interior chamber 37 generally at atmospheric pressure. The streamer 16 may be assembled from segments, each segment being about 75 to 100 meters in length. The segments may be joined end to end by including a termination plate 30 at the longitudinal ends of each segment. Strength members 32, which extend along the length of each segment, may be affixed to the termination plate 30 to enable transmission of axial loading between segments, or between a segment coupled to one of the tilt sensor modules 20 as shown in FIG. 3. The electrical/optical connector 31 may be sealed against water intrusion by o-rings 33 or similar seal disposed externally to the electrical/optical connector 31. Certain of the conductors in the wire harness 34 may provide electrical power to the various components in the tilt sensor module 20 as will be explained below. The termination plate 30 may be configured to be coupled to another termination plate on another streamer segment. In the present example, the housing 35 may be configured to couple to the termination plate 30 in the same manner as to another termination plate to simplify assembly of the streamer 16.

A tilt sensor 38 may be mounted in a gimbal bearing frame 40 to the interior of the housing 35. The tilt sensor 38 may be mounted in the frame 40 so that it remains substantially vertically oriented notwithstanding twisting of the streamer 16 during operation. The tilt sensor 38 may measure tilt along only one direction, and in some embodiments, the direction may be along the longitudinal dimension of the streamer. In other embodiments, the tilt sensor 38 may measure tilt along such dimension and in a direction orthogonal to the longitudinal dimension of the streamer. In one embodiment, the tilt sensor 38 may be an electrolytic bubble level type such as one made by Spectron, Inc., Hauppage N.Y. sold under model designation SP500. The purpose for a two-axis tilt sensor will be explained below. Another example is a micro-electrical-mechanical system (MEMS) tilt sensor sold by RST Instruments, 200-2050 Hartley Avenue, Coquitlam, British Columbia, Canada. Electrical output of the tilt sensor 38 may be conducted to a first preamplifier 42, the output of which may be digitized in a first analog to digital converter (ADC) 46. Output of the first ADC 46 may be conducted to a microcontroller 50. A signal output of the microcontroller, shown as line 51, may be conducted to the LFD control device 22 coupled adjacent to the tilt sensor module 20. If a two-axis tilt sensor is used, output of the second signal channel of such sensor may be conducted to a second preamplifier 44, the output of which may be digitized in a second ADC 48. The output of the second ADC 48 may be conducted to the microcontroller 50. In the example shown in FIG. 3, one of the depth sensors 21 may be mounted in the housing. Output of the depth sensor 21 may be amplified in a third preamplifier 52 and digitized in a third ADC 54 before being conducted to the microcontroller 50.

The other longitudinal end of the housing 35 may be coupled to one end of the housing 22A of the LFD control device 22 in a manner similar to the coupling of the streamer segment termination plate 30 to the opposite end of the housing 35. Such coupling may include electrical/optical connectors 31 substantially as explained above with reference to the connection between the streamer segment and the housing 35.

In some embodiments, tilt sensor module 20 may be capable of detachment and reattachment with the streamer 16. Such mounting of the tilt sensor module 20 enables calibration of the tilt sensors 38 when the tilt sensor modules 20 are removed from the streamer 16. In some embodiments, tilt sensor module 20 may be a component of a LFD control devices 22, which itself is capable of detachment and reattachment with the streamer 16. This provides for laboratory calibration of the tilt sensors, thereby facilitating a regular and easily controllable calibration of the tilt sensors. It should be understood that tilt sensor modules 20 which are permanently integrated into a streamer 16 may pose many calibration challenges, including assuring simultaneous, consistent calibration.

Certain functional parts of the LFD control device are omitted from FIG. 3 for clarity of the illustration, however, the principle of operation of the tilt sensor module 20 with respect to the LFD control device 22 may be as follows for embodiments wherein the selected depth profile is one of substantially uniform depth along the entire streamer. If the tilt sensed by a tilt sensor 38 at a particular location on the streamer is toward the aft end of the streamer (away from the vessel 10 in FIG. 1), then the microcontroller 50 may generate a control signal to cause the associated LFD control device 22 to generate upward force, thus lifting the portion of the streamer proximate the LFD control device 22 and the tilt sensor module 20. Conversely, if the tilt measured at the particular location is toward the front end of the streamer, the microcontroller 50 may generate a control signal to cause the LFD control device to generate downward force. When the tilt sensor 38 measures zero tilt (or tilt below a selected threshold) along the length of the streamer, the microcontroller 50 may generate a signal to cause the LFD control device 22 to generate no upward or downward force.

Figure 4:
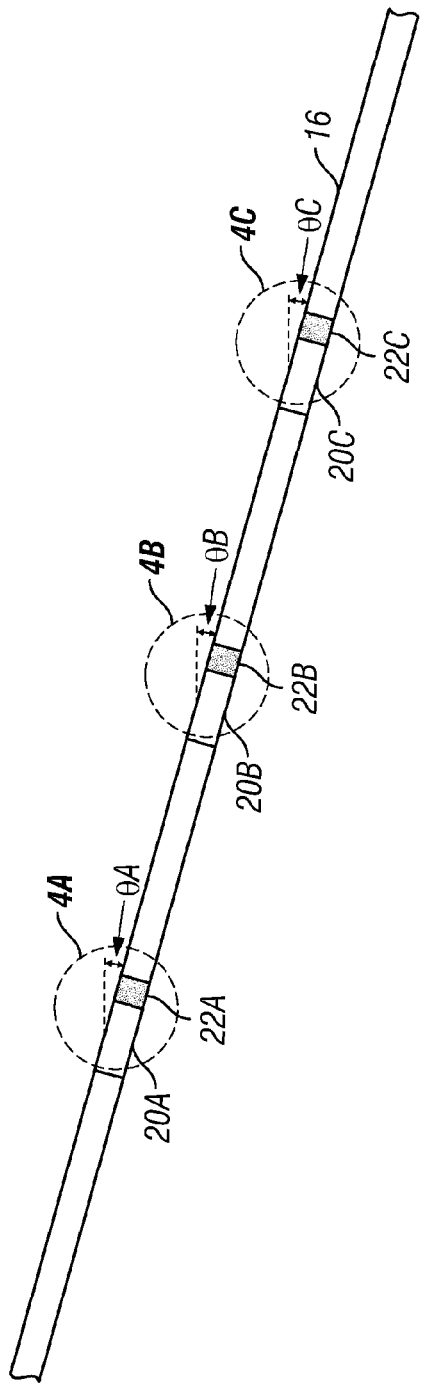
FIG. 4 shows an example of operation of tilt sensor modules in a geophysical survey system, according to an embodiment of the invention.
Figure 4C:
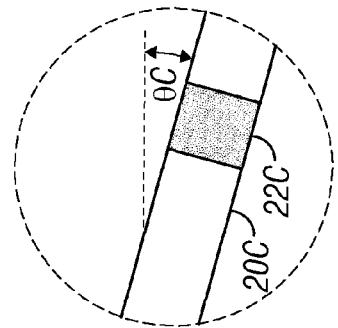
FIGS. 4A, 4B and 4C show enlarged views of the example tilt sensors of the geophysical survey system shown in FIG. 4.
Figure 4B:
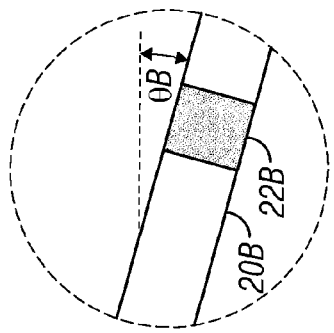
Figure 4A:
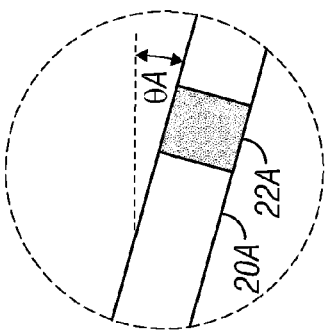

As would be understood by one of ordinary skill in the art with the benefit of this disclosure, the principle of operation of the tilt sensor module 20 with respect to the LFD control device 22 may be similar for embodiments with other depth profiles. One example is illustrated in FIG. 4. If the depth profile indicates a substantially uniform slope of tilt angle T (as in FIG. 2), and if the tilt $\theta_A$ sensed by the tilt sensor $38_A$ associated with tilt sensor module $20_A$ is less than T, then the microcontroller $50_A$ (also associated with tilt sensor module $20_A$) generates a control signal to cause the LFD control device $22_A$ to generate upward force, thus lifting the portion of the streamer proximate the LFD control device $22_A$ and the tilt sensor module $20_A$. Conversely, if the tilt $\theta_A$ sensed by the tilt sensor $38_A$ is greater than T, then the microcontroller $50_A$ may generate a control signal to cause the LFD control device $22_A$ to generate downward force. When the tilt sensor $38_A$ measures tilt $\theta_A$ within a selected threshold of T, the microcontroller $50_A$ may generate a signal to cause the LFD control device $22_A$ to generate no upward or downward force. Corresponding tilt angles $\theta_B$ and $\theta_C$ may be measured by a tilt sensor (38 in FIG. 3) in each of a plurality of additional tilt sensor modules $20_B$ and $20_C$. As will be explained below, each tilt sensor may be in signal communication with a respective microcontroller (50 in FIG. 3) to operate a respective LFD device $22_B$, $22_C$. Enlarged views of each of the tilt sensor modules $20_A$, $20_B$, $20_C$ and corresponding LFD devices 22A, 22B, 22C are shown, respectively, in FIGS. 4A, 4B and 4C. Each of the tilt sensor modules $20_A$, $20_B$, $20_{C_C}$ may measure a tilt angle $\theta_A$, $\theta_B$ and $\theta_{C_C}$ as shown in FIGS. 4A, 4B and 4C, respectively.

In another aspect of the invention, measurements made by the depth sensor 21 in each tilt sensor module 20 may be communicated over a conductor in the wire harness 34 from the microcontroller 50 to the controller in each of the other tilt sensor modules 20 in the streamer 16. The microcontroller 50 may include programming instructions to send a control signal to the associated LFD control device to either raise or lower sections of the streamer until the measurements made by each depth sensor are substantially equal, or differ from each other by at most a selected threshold. By matching depths, and levelling the measured tilt, the entire streamer may be maintained substantially in a straight, horizontal line. Alternatively, the microcontroller 50 may include programming instructions to send a control signal to the associated LFD control device to either raise or lower sections of the streamer until the measurements made by each depth sensor are within a selected threshold of a calculated depth corresponding to the selected depth profile at that section, wherein the calculated depth for each depth sensor may differ to match the corresponding depth profile.

Microcontroller 50 may receive signals from each of the sensors in the streamer and LFD's (e.g., tilt sensors, depth sensors, geophysical sensors, etc.) to regulate the actual depth profile of the streamer during operation of the LFD's. For example, in some embodiments, microcontroller 50 may restrict, reduce, or eliminate vertical movement of a section of streamer 16—that would otherwise be required to achieve the selected depth profile—to mitigate movement-induced noise in the associated geophysical sensor. Microcontroller 50 may utilize advanced control algorithms, for example, proportional integral differential regulators or digital algorithms such as fuzzy logic wherein the tilt of the streamer can be seen as the derivative of the depth.

In examples where a two-axis tilt sensor is used, the second axis signal may be used as a discriminator. If the tilt measured orthogonal to the length of the streamer is above a selected threshold, for example, the microcontroller 50 may be programmed not to generate a control signal to operate the LFD control device 22, or may generate a signal to cause the LFD control device 22 to generate no upward or downward force. In such cases, the tilt sensor 38 may not be oriented vertically, and measurements of tilt along the length of the streamer may be inaccurate.

A depth and tilt control system according to the invention may enable more precise control of depth along one or more sections of an entire streamer in water depths for which the accuracy of pressure measurements is insufficient.

If there is any conflict in the usages of a word or term in this specification and one or more patent or other documents that may be incorporated herein by reference, the definitions that are consistent with this specification should be adopted for the purposes of understanding this invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A depth and tilt control system for a geophysical sensor streamer, comprising:
   a plurality of tilt sensors disposed at spaced apart locations along the geophysical sensor streamer, each tilt sensor having a first tilt sensing element arranged to measure tilt of the geophysical sensor streamer along a longitudinal direction of the geophysical sensor streamer proximate the associated spaced apart location;
   a plurality of LFD control devices, each disposed proximate one of the tilt sensors along the geophysical sensor streamer;
   a plurality of microcontrollers, each microcontroller in signal communication with at least one of the LFD control devices and its associated tilt sensor, wherein each microcontroller is capable of utilizing the tilt measured by the associated tilt sensor to selectively operate the associated LFD control device; and
   a controller in signal communication with each of the plurality tilt sensors and each of the plurality of microcontrollers, the controller comprising instructions to operate each of the LFD devices in response to the tilt signals from the plurality of tilt sensors to cause the geophysical sensor streamer to maintain a selected depth profile.

2. The system of claim 1, wherein each tilt sensor is an electrolytic bubble level sensor.

3. The system of claim 1, wherein each tilt sensor is a micro-electrical-mechanical-system tilt sensor.

4. The system of claim 1, wherein each tilt sensor is mounted in a gimbal bearing frame such that each tilt sensor is maintained in substantially vertical orientation.

5. The system of claim 4, wherein each tilt sensor further comprises a second tilt sensing element capable of measuring tilt in a direction orthogonal to the first tilt sensing element, the second tilt sensing element in signal communication with the microcontroller associated with the tilt sensor.

6. The system of claim 5, wherein each microcontroller is configured not to operate the associated LFD control device when the respective second tilt sensing element indicates the tilt sensor is oriented other than substantially vertically.

7. The system of claim 1, further comprising a plurality of depth sensors, each disposed proximate one of the tilt sensors along the geophysical sensor streamer and in signal communication with the associated microcontroller, wherein each associated microcontroller is capable of utilizing the depth measured by the associated depth sensor to selectively operate the associated LFD control device to cause the geophysical sensor streamer to align with the selected depth profile.

8. The system of claim 7, wherein each depth sensor is a pressure sensor.

9. The system of claim 1, wherein each tilt sensor is capable of detachment from the geophysical sensor streamer for laboratory calibration.

10. The system of claim 1, wherein each tilt sensor is a component of its associated LFD control device.

11. The system of claim 1, further comprising a plurality of geophysical sensors disposed along the geophysical sensor streamer, wherein each microcontroller is in signal communication with at least one of the geophysical sensors.

* * * * *